United States Patent [19]

Spisak

[11] 4,146,273
[45] Mar. 27, 1979

[54] RETAINER FOR WHEEL TRIM

[76] Inventor: Edward G. Spisak, 35700 Oakwood La., Westland, Mich. 48185

[21] Appl. No.: 828,267

[22] Filed: Aug. 29, 1977

[51] Int. Cl.² .............................................. B60B 7/06
[52] U.S. Cl. .................................. 301/37 R; 301/37 P
[58] Field of Search ................. 301/37 R, 37 P, 37 B, 301/37 T, 37 PB, 37 TP, 37 CD, 37 C, 108 R, 108 A; 24/108 R, 108 A; 29/159 A

[56] References Cited
U.S. PATENT DOCUMENTS

| | | | |
|---|---|---|---|
| 3,773,390 | 11/1973 | Foster et al. ......................... | 301/37 R |
| 4,003,604 | 1/1977 | Connell ............................. | 301/37 CD |

FOREIGN PATENT DOCUMENTS

| | | | |
|---|---|---|---|
| 581828 | 8/1959 | Canada ................................. | 301/37 R |
| 2249539 | 4/1974 | Fed. Rep. of Germany ...... | 301/108 R |

Primary Examiner—Stanley H. Tollberg
Assistant Examiner—Charles A. Marmor
Attorney, Agent, or Firm—Fisher, Gerhardt & Groh

[57] ABSTRACT

A wheel trim assembly including a metal retainer having teeth for bitingly engaging the flange of a vehicle wheel to hold the trim assembly in position on the wheel. The retainer is provided with an arm member which tends to lift the teeth out of engagement with the wheel after the trim assembly has been moved a predetermined axial distance. The arm also prevents the retainer from being bent excessively to exceed the elastic limits of the material making up the retainer.

2 Claims, 5 Drawing Figures

U.S. Patent  Mar. 27, 1979  4,146,273
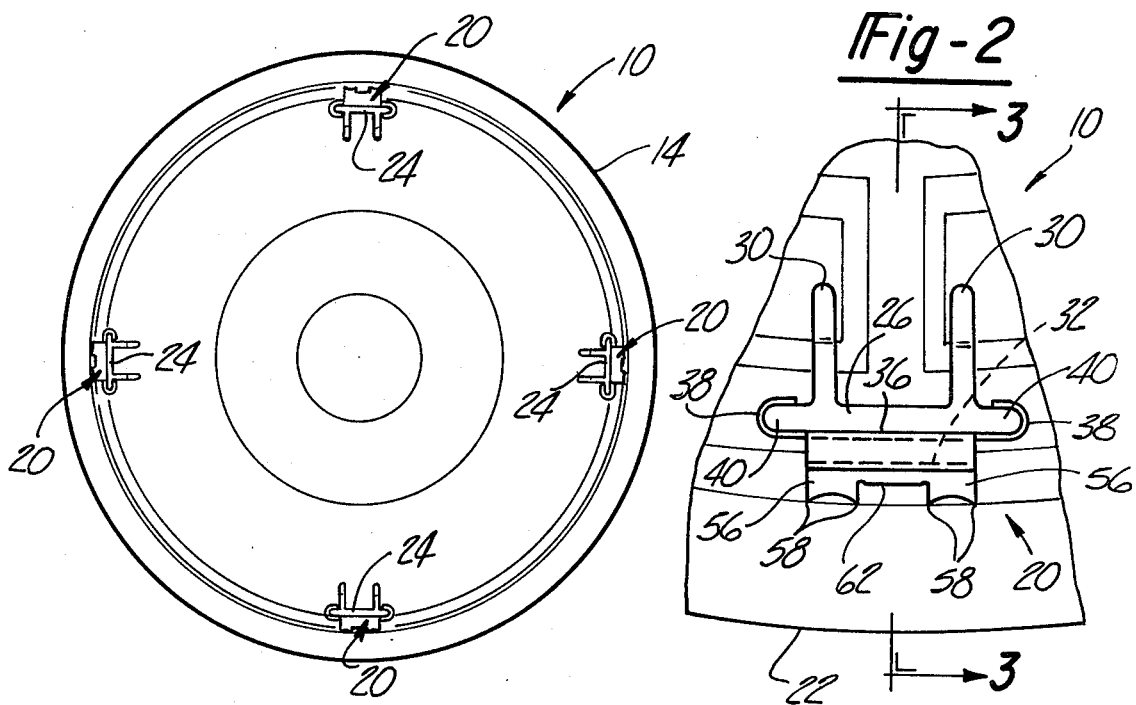
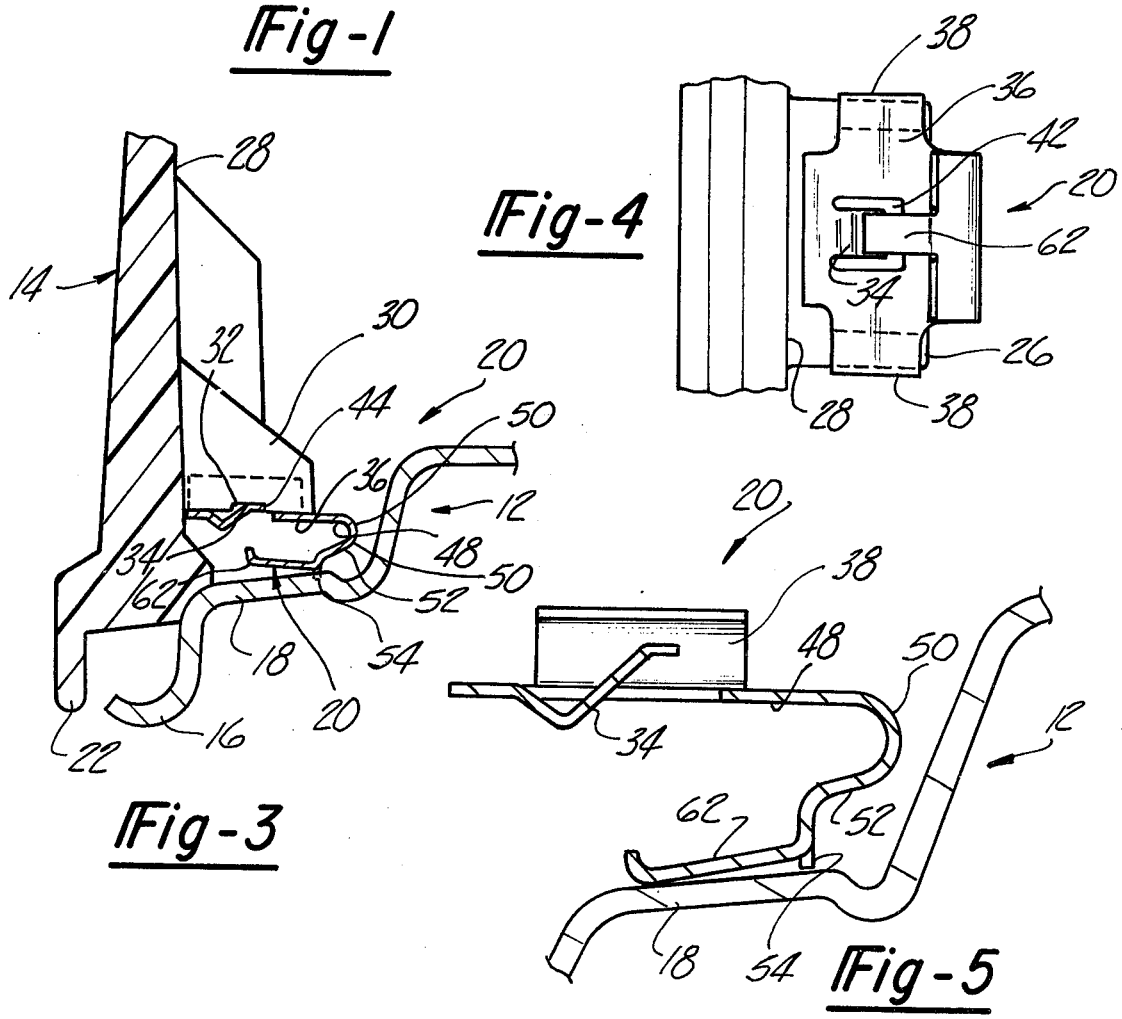

RETAINER FOR WHEEL TRIM

This invention relates to decorative wheel trim assemblies for use on automotive vehicle wheels and more particularly to an improved retaining arrangement for holding the trim assembly on the wheel.

Vehicle trim in the form of a wheel cover to cover the entire wheel or in the form of an annular, decorative ring for the outer circumferencial portion of the vehicle wheel are difficult to maintain in position on the wheel because the wheel itself is subjected to complex loading and stresses tending to temporarily deform the wheel as a result of braking, vehicle loading, and other maneuvering of the vehicle during which time it is subjected to vibrations and shocks from the road surface. In addition the wheel trim assembly is subjected to a centrifugal loading and inertia tending to cause relative movement between the wheel and trim assembly. To overcome such problems various retainers have been proposed and the tendency is to make the retainers so that they grip the wheel with a large force making it difficult to remove the trim from the wheel when servicing is required. Frequently, the removal of wheel trim from the wheel causes a permanent distortion of the retainers so that replacement of the wheel trim on the wheel is prevented or if replacement is accomplished, the retainer is not suitable for properly holding the wheel trim in position.

It is an object of the invention to provide a wheel trim and particularly an improved retainer arrangment for a wheel trim in which the retainers permit removal of the wheel trim without distortion of flexing of the retainers beyond the elastic limit of the material from which they are made so that the retainers are reusable.

Still another object of the invention is to provide a wheel trim arrangement having retainers that prevent displacement axially and circumferencially and at the same time permit easy removal of the wheel trim.

The objects of the present invention are accomplished by a wheel trim assembly embodying retainers which have a base portion adapted for attachment to the wheel trim and acting to support a blade for bitingly engaging the flange of the wheel to prevent removal of the wheel trim. The blade is supported relative to the base by a looped, resilient portion which biases the teeth of the blade into the wheel flange with a strong force preventing axial movement of the wheel trim relative to the wheel. The looped portion tends to open upon axial movement of the wheel trim so that the biasing force increases as the wheel trim is moved axially. The extent of such increase in biasing force is limited by an arm member which protrudes from the blade portion to engage the flange of the wheel as the loop opens so that the blade portion is lifted out of biting engagement with the wheel flange thereby permitting easy removal of the wheel. This prevents the looped portion from being distorted excessively exceeding the elastic limit of the material used to form the retainer.

These and other objects of the invention will become apparent from the following description and from the drawings in which:

FIG. 1 is a rear plan view of a wheel trim assembly embodying the invention;

FIG. 2 is a view of a portion of the wheel trim assembly seen in FIG. 1 but at a greatly enlarged scale;

FIG. 3 is a sectional view taken on line 3—3 in FIG. 2 showing the relationship of the wheel trim assembly relative to the tire rim of a vehicle wheel;

FIG. 4 is a bottom view of a portion of the wheel trim portion seen in FIG. 3 and;

FIG. 5 is a view similar to FIG. 3 but showing the relationship of the wheel trim assembly and tire rim during the process of removing the wheel trim.

A wheel trim assembly including the improved retaining arrangement embodying the invention is designated generally at 10 and is adapted for connection to the wheel of a vehicle, a portion of which is indicated at 12 in FIGS. 3 and 5.

The wheel trim assembly 10 may be in the form of a ring, or as seen in the drawings, a full wheel cover 14 made of metal or plastic material. The wheel cover 14 is attached to the vehicle wheel 12 which as seen in FIG. 3 has a radially outer lip 16 and an axially extending annular flange 18. The flange 18 of the wheel is bitingly engaged by metal retaining devices 20 which are mounted on circumferentially spaced portions of the wheel trim 14 and serve to hold the wheel trim in position on the wheel.

The metal retaining devices 20 are each made of a single piece of material, preferably hardened, spring-like steel. The retaining devices 20 are mounted on the back or rear face of the wheel cover 14. Preferably a minimum of three retaining devices are used and are spaced uniformly about the circumference of the cover 14 or as seen in FIG. 1, an even number of retaining devices are disposed with pairs in diametrically opposed relationship to each other. The metal retainers 20 are disposed on a circle of the wheel cover 14 generally coextensive with the tire rim flange 18.

The metal retainers 20 are shown as supported on bracket portions 24 formed of plastic. The bracket protions 24 may be attached to the wheel cover 14 by conventional fasteners or in the case where the wheel cover is made of plastic, the bracket may be molded integrally with the wheel cover. The bracket portions 24 each include a platform 26 which projects axially from the rear face 28 of the wheel cover 14 and extends generally to an imaginary circle spaced radially inwardly a slight amount from the axially extending annular flange 18. A pair of supporting bracket webs 30 extend from the radial underside of the platform 26 and act to reinforce the bracket portion 24 against loads imposed radially inwardly toward the axis of rotation. The radially outer surface of the platform 26 is provided with a recess 32 to receive a spring clip 34 forming part of the retainer 20.

The retainer 20 is made of single piece of metal and includes a flat base portion 36 adapted to rest on the platform portion 26 of the bracket member 24. The base portion 26 has a pair of spaced hook portions 38 at opposite edges of the base member 36. The hook portions 38 engage circumferentially spaced side edges 40 of the bracket member 24 to prevent relative circumferential movement between the retainer 20 and bracket member 24.

The base portion of the retainer assembly 20 includes the spring clip 34 which is formed as seen in FIG. 4 by cutting a generally U-shaped portion 42 from the base member. The spring clip 34 is bent to be positioned radially inwardly of the base member and to be disposed within the recess 32 with the edge 44 in engagement with a wall of the recess.

As seen in FIG. 3, the base portion 36 of the retainer 20 merges with one leg 48 of a loop or U-shaped portion 50. The other leg 52 of the U-shaped portion 50 merges with a blade portion 54 that is disposed generally perpendicular to the base portion when the wheel trim and retaining devices are detached from the wheel of the vehicle.

As best seen in FIG. 2, the blade portion 54 is provided with a pair of toothed portions 56 each of which has a pair of teeth 58. The points of the teeth 58 are on an arc conforming generally to the curvature of the surface of the wheel flange 18. The teeth are adapted to bite into the metal flange 18 to the wheel 12 to resist relative axial and circumferential movement between the wheel and wheel trim.

Referring now to FIG. 3, the blade 54 is provided with an arm 62 which extends axially outwardly from the wheel and from between the pair of toothed poritons 56 to extend generally perpendicualr to the blade 54 so that it lies in slightly spaced but adjacent relationship to the wheel flange 18 in the attached position.

The retainer members 20 may be attached to the wheel cover 14 by aligned the hooks 38 with the spaced edges 40 of the platform 26 of the bracket member 24. Thereafter, the retainers 20 are pushed axially against the back face 28 of the wheel cover 14. During that time, the spring clip 34 is deflected radially outwardly by the radial outward surface of the platform 26 until the edge 44 drops into the recess 32. The edge 44 engages the wall of the recess and prevents axial displacement and removal of the retainer 20 except with the use of tools. The engagement and hook portion 38 with edge 40 serves to prevent relative circumferential and axial displacement between the retainer 20 and bracket member 24. Attachment is readily accomplished in this manner without the use of tools or additional fasteners.

When the retainers 20 have all been located on the wheel cover 14, attachment of the cover to the wheel 12 of a vehicle is accomplished by pushing the wheel cover generally axially into engagement with the wheel. During this time the blade portions 54 of the retaining members 20 engage the wheel flange 18. Inward movement of the wheel trim assembly 10 will act to increasingly deflect the blade portion 54 and the U-shaped loop portion 50 so that in the final attached position, the blade portion 54 is disposed at a slight angle to the wheel flange 18 and the U-shaped portion 50 becomes slightly deflected. Such deflection is facilitated by the leg 48 cantilevered beyond the radial inner edge of the platform 40. The loop portion 50 which is spaced from the wheel, tends to exert a biasing force which forces the tips of the teeth 58 into biting engagement with the flange 18.

When the trim assembly is to be removed from the wheel it must be moved axially outwardly from the wheel or to the left as view in FIGS. 3 and 5. This may be accomplished by prying with a tool such as a screwdriver or the like inserted adjacent the outer lip of wheel 12. Initial axial movement of the wheel trim cause the teeth 58 to stay in a relatively fixed point or position relative to the flange 18 and the loop portion 50 tends to unfold or open so that the legs 48 and 52 move away from each other. In the initial stage of movement, this action increases the resistance to removal of the trim assembly. Also, such movement causes the end of arm 62 to move into engagement with the flange 18 at another point spaced from the original location of the teeth. Continued axial movement of the wheel trim 14 unwinds or opens the U-shaped loop portion 50 still further and the end of the arm 62 tends to lift the ends of the teeth 58 out of engagement with the flange 18. This makes it possible to slide the wheel trim member axially outwardly relative to the wheel for removal from the wheel 12 with minimum resistance. Also, the action of the arm 62 prevents the loop portion 50 from opening beyond the elastic limit so that the loop 50 becomes permanently deformed.

A wheel trim assembly has been provided in which retaining devices are mounted on a decorative trim member such as a wheel cover or a ring. The retaining devices are supported in circumferentially spaced apart relationship near the periphery of the wheel trim member and include blade members with teeth which are urged into biting engagement with the flange of a vehicle wheel to maintain the wheel trim in mounted relationship. The teeth are urged into engagement by a resilient looped portion which exerts a biasing force tending to increase resistance to removal of the wheel trim until such time that an arm member engages the wheel to lift the teeth out of engagement from the wheel so that subsequent axially outward movement is accomplished with a minimum of resistance. The arm also serves to protect the spring-like biasing portion from being excessively distorted and damaged.

I claim:

1. A wheel trim assembly for attachment to a wheel of a vehicle having an inner, generally axially extending wheel flange, said assembly comprising; a wheel trim member movable axially inwardly into engagement with said wheel, a retainer mounted on a support portion of said wheel trim assembly and having an axially extending base portion adapted to be positioned adjacent to said wheel flange, a radially extending blade, a looped portion supporting said blade and having radially inner and outer legs extending axially of said wheel trim, said outer leg supporting said blade and said inner leg being formed integrally with said base and being cantilevered axially away from said support portion and inwardly of said wheel, said loop portion being spaced from said wheel when said trim member is in engagement with said wheel for flexing of said loop portion independently of said wheel to bias said blade into biting engagement with said wheel flange, arm means extending axially outwardly from said blade and being operative upon axial movement of said wheel trim out of engagement and axially of said wheel to engage with said wheel flange to limit flexing of said loop portion and move said blade out of engagement with said wheel to permit easy removal of said wheel trim assembly from said wheel.

2. The combination of claim 1 wherein said blade is formed with teeth biting and engaging said wheel flange and wherein said arm means extends from said blade a distance several times longer than the radial extent of said teeth from said arm means.

* * * * *